R. T. TORKELSON.
WIRE ROPE CLAMPING DEVICE.
APPLICATION FILED JAN. 23, 1919.
1,297,039.
Patented Mar. 11, 1919.
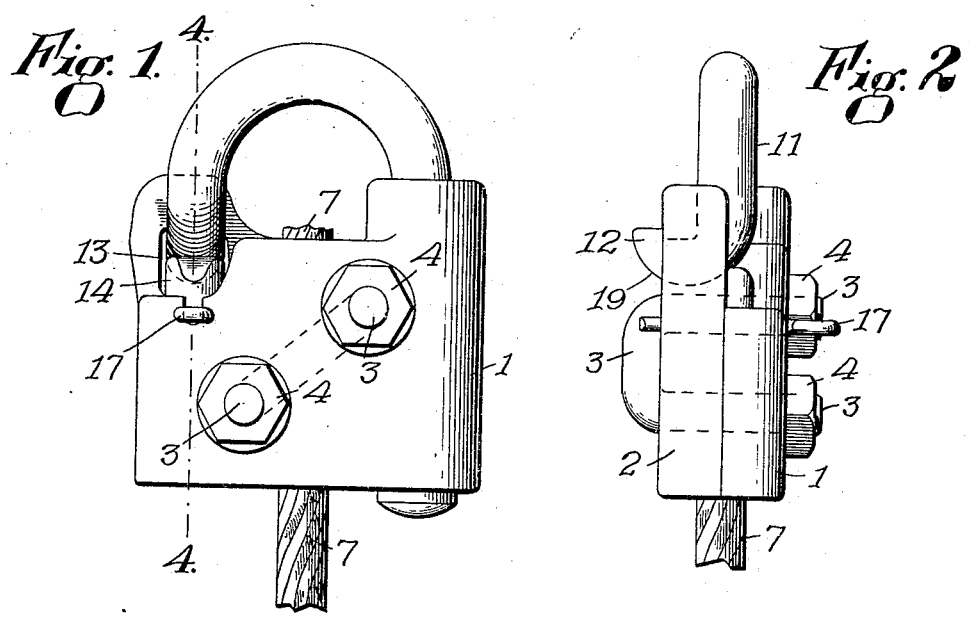
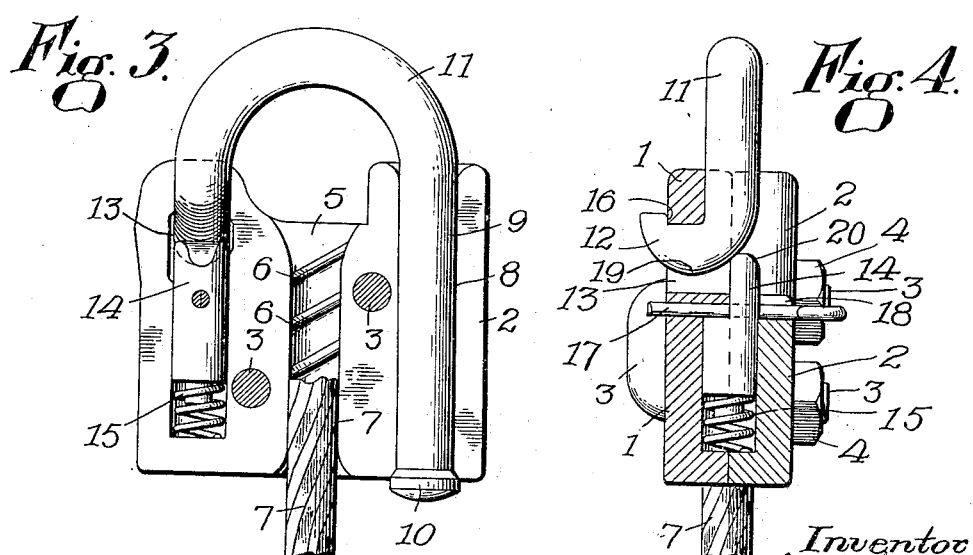

UNITED STATES PATENT OFFICE.

REINHARD T. TORKELSON, OF WORCESTER, MASSACHUSETTS, ASSIGNOR TO FREDERIC I. JOHNSON, OF FITCHBURG, MASSACHUSETTS.

WIRE-ROPE-CLAMPING DEVICE.

1,297,039.  Specification of Letters Patent.  Patented Mar. 11, 1919.

Application filed January 23, 1919. Serial No. 272,685.

*To all whom it may concern:*

Be it known that I, REINHARD T. TORKELSON, a citizen of the United States, residing at Worcester, in the county of Worcester and Commonwealth of Massachusetts, have invented a new and useful Improvement in Wire-Rope-Clamping Devices, of which the following, together with the accompanying drawings, is a specification.

The object of my present invention is to provide a clamping device adapted to hold the end of a wire rope and provided with a looped or hooked member by which the clamping device may be attached. My improved clamping device is especially adapted for holding the ends of short pieces of wire rope which are employed to cross transversely the tires of automobile trucks to prevent them from skidding. The loops or hooks of my improved clamp are adapted to engage the side chains of such anti-skidding devices, but they are also adapted for the suspension of the wire rope or to engage loads to be lifted by the wire rope.

Referring to the accompanying drawings,

Figure 1 represents a front view of my improved clamping device with a piece of wire rope held therein.

Fig. 2 is an edge view of the same.

Fig. 3 is a side view of one of the clamping members, the other member having been removed, and Fig. 4 is an edge view shown in section on the plane of the line 4—4, Fig. 1.

Similar reference characters refer to similar parts in the different figures.

My improved clamping device consists of two members drawn tightly together upon an inclosed piece of wire rope by means of bolts and nuts. Referring to Figs. 1 and 3, 1 represents one member of the clamping device and 2, Fig. 3, represents the other member, united by bolts 3, 3 which are provided with nuts 4, 4, Fig. 1. The central portion of the two clamping members 1 and 2 has a hole 5 therethrough provided on its inner surface with a series of diagonal ribs 6, 6 in order to receive and securely hold a piece of wire rope 7.

The clamping members 1 and 2 when brought together inclose a hole 8 to receive a spindle 9 loosely held therein and capable of a rotative movement and also of a slight sliding movement, said spindle having upon its end an enlarged head 10 to prevent its removal from the clamp. The spindle 9 is bent in semi-circular form to form a loop 11, which terminates in a hook 12 adapted to engage an opening 13 in the clamping member 1. Beneath the hook 12 is a spring actuated plunger 14 which is pressed by a spiral spring 15 against the under side of the hook 12, causing the latter to be forced upwardly until a shoulder 16 engages the clamping member 1, thereby preventing withdrawal of the hook from the opening 13 until the plunger 14 has been forced downwardly, when the spindle 9 can be swung to withdraw the hook 12 from the opening 13. In order to lock the plunger 14 from being moved downwardly, a cotter pin 17 is inserted through a hole 18 passing through the clamping members 1 and 2 and also through a hole in the plunger 14. The bottom of the hook 12 is rounded at 19 and the top of the plunger 14 is slightly rounded at 20, to enable the hook to pass the plunger 14 and cause the plunger to be forced downwardly as the hook 12 is forced through the opening 13. In order to withdraw the hook 12, the cotter pin 17 is removed and the spindle 9 is forced downwardly until the shoulder 16 becomes disengaged, when the spindle 9 is swung on its axis to remove the hook.

My improved clamping device is capable of being used for a great variety of purposes; for example, the loop 11 may engage the hook for the purpose of suspending the wire rope, or the loop may be employed to engage a load which is being lifted by the wire rope.

I claim,

1. In a device of the character described, a pair of clamping members recessed to receive a wire rope, a loop member held by said clamping members and slidable therein, and a spring actuated plunger applied to said loop member to resist its sliding movement.

2. In a device of the character described, a pair of clamping members recessed to receive a wire rope, a loop member slidably held by said clamping members and capable of rotating therein and provided with a hook engaging the clamping members, whereby said loop member is held from rotation.

3. In a device of the character described, a pair of clamping members recessed to receive a wire rope and provided with ribs on the inner wall of the recess to engage a wire rope, a loop member held by said clamping member and slidable therein, and means for locking said loop member against a sliding movement.

4. In a device of the character described, a pair of clamping members recessed to receive a wire rope, a rotatable loop member held in said clamping members and capable of a sliding movement therein, a hook carried by said loop member and engaging the clamping members to hold the loop member from rotation, and a spring actuated plunger bearing against said hook, said hook having a rounded surface contacting with said plunger by which said plunger is depressed as the hook is swung into position.

Dated this seventeenth day of January, 1919.

REINHARD T. TORKELSON.

Witnesses:
NELLIE WHALEN,
PENELOPE COMBERBACH.

Copies of this patent may be obtained for five cents each, by addressing the "Commissioner of Patents, Washington, D. C."